US009679369B2

(12) United States Patent
Crowder et al.

(10) Patent No.: US 9,679,369 B2
(45) Date of Patent: Jun. 13, 2017

(54) DEPTH KEY COMPOSITING FOR VIDEO AND HOLOGRAPHIC PROJECTION

(71) Applicant: VENTANA 3D LLC, Santa Monica, CA (US)

(72) Inventors: Ashley Crowder, Venice, CA (US); Benjamin Conway, Santa Monica, CA (US)

(73) Assignee: VENTANA 3D LLC, Van Nuys, CA (US)

( * ) Notice: Subject to any disclaimer, the term of this patent is extended or adjusted under 35 U.S.C. 154(b) by 251 days.

(21) Appl. No.: 14/285,905

(22) Filed: May 23, 2014

(65) Prior Publication Data

US 2015/0070467 A1 Mar. 12, 2015

Related U.S. Application Data

(60) Provisional application No. 61/876,950, filed on Sep. 12, 2013.

(51) Int. Cl.
*H04N 5/33* (2006.01)
*G06T 5/10* (2006.01)
(Continued)

(52) U.S. Cl.
CPC .................. *G06T 5/10* (2013.01); *G06T 7/11* (2017.01); *G06T 7/194* (2017.01); *H04N 5/2226* (2013.01);
(Continued)

(58) Field of Classification Search
CPC ......... H04N 13/0203; H04N 5/33; G06T 5/10
See application file for complete search history.

(56) References Cited

U.S. PATENT DOCUMENTS 5,865,519 A 2/1999 Maass
8,418,068 B1 * 4/2013 Backus .............. H04N 1/00167
345/619
(Continued)

FOREIGN PATENT DOCUMENTS

JP 2005-275795 A 10/2005

OTHER PUBLICATIONS

Crowder, et al., "Depth Key Compositing for Video and Holographic Projection and Associated Live Streaming Entertainment System", U.S. Appl. No. 61/876,950, filed Sep. 12, 2013, 28 pages, U.S. Patent and Trademark Office, Alexandria, VA.
(Continued)

*Primary Examiner* — Nam Pham
(74) *Attorney, Agent, or Firm* — Parker Ibrahim & Berg LLC; James M. Behmke; Stephen D. LeBarron

(57) ABSTRACT

According to embodiments herein, depth key compositing is the process of detecting specific desired portions/objects of a digital image using mathematical functions based on depth, in order to separate those specific portions/objects for further processing. In one particular embodiment, a digital visual image is captured from a video capture device, and one or more objects are determined within the digital visual image that are within a particular depth range of the video capture device. From there, the one or more objects may be isolated from portions of the digital visual image not within the particular depth range, and the isolated objects are processed for visual display apart from the portions of the digital visual image not within the particular depth range. Also, in certain embodiments, the detected portion of the digital image (isolated objects) may be layered with another image, such as for film production, or used for holographic projection.

20 Claims, 8 Drawing Sheets

(51) Int. Cl.
    *H04N 5/222*     (2006.01)
    *H04N 5/275*     (2006.01)
    *G06T 7/11*     (2017.01)
    *G06T 7/194*     (2017.01)

(52) U.S. Cl.
    CPC ... *H04N 5/275* (2013.01); *G06T 2207/10028* (2013.01); *G06T 2207/10048* (2013.01)

(56) References Cited

U.S. PATENT DOCUMENTS

| | | |
|---|---|---|
| 2009/0213219 A1 | 8/2009 | Eggert et al. |
| 2010/0182340 A1 | 7/2010 | Bachelder et al. |
| 2011/0237324 A1 | 9/2011 | Clavin et al. |
| 2012/0306904 A1 | 12/2012 | Francois et al. |
| 2013/0136358 A1* | 5/2013 | Dedhia ................ G06T 7/0093 382/173 |
| 2014/0071305 A1* | 3/2014 | Hiasa ................ H04N 5/23212 348/218.1 |

OTHER PUBLICATIONS

International Search Report dated Dec. 5, 2014 issued in connection with PCT/US2014/055339.

* cited by examiner

DEPTH KEY COMPOSITING FOR VIDEO AND HOLOGRAPHIC PROJECTION

RELATED APPLICATION

The present application claims priority to U.S. Provisional Application No. 61/876,950, filed Sep. 12, 2013, entitled: DEPTH KEY COMPOSITING FOR VIDEO AND HOLOGRAPHIC PROJECTION AND ASSOCIATED LIVE STREAMING ENTERTAINMENT SYSTEM, by Crowder et al., the contents of which are incorporated by reference herein.

TECHNICAL FIELD

The present disclosure relates generally to video processing, and, more particularly, to key-based compositing, such as for live streaming technologies.

BACKGROUND

Chroma Keying or Chroma Key Compositing is generally a post-production technique of layering two film images together based on color. For example, as is well understood in the art, a person or object may be filmed in front of a "green screen" (though any color may be used), and the green color is replaced through software with another background image. One problem with such an approach, however, is that it requires a solid color background, where the person or object must be placed between a camera and the solid color in order for the Chroma Keying to work properly. Another problem, is that the environment must be carefully planned so that the person or object does not have any of the solid color (e.g., green) on them, such as a shirt or tie, otherwise the software mistakenly detects the color as something to replace, resulting in strange artifacts of a background image appearing on the person or object.

A similar technique that does not require a solid color background may remove background objects based on a tracked user being specified by their skeletal recognition. In particular, this technique uses various image processing techniques to select and track a single person as the foreground, and remove the rest of the background from the scene. Notably, however, this technique currently does not allow for multiple people to be set as the foreground, nor does it allow for any non-human objects to be considered as the foreground (or a part thereof). Also, this technique requires a stagnant background (e.g., the tracked person should stand in a relatively uncluttered space, avoid standing in front of a very dark background or very bright light source pointing towards a sensor, and avoid holding a large reflective item), and the person or object cannot leave the frame.

SUMMARY

According to embodiments herein, depth key compositing is the process of detecting specific desired portions/objects of a digital image using mathematical functions based on depth, in order to separate those specific portions/objects for further processing. In particular, in one specific embodiment, a digital visual image is captured from a video capture device, and a process determines one or more objects within the digital visual image that are within a particular depth range of the video capture device. From there, the one or more objects may be isolated from portions of the digital visual image not within the particular depth range, and the one or more isolated objects are processed for visual display apart from the portions of the digital visual image not within the particular depth range.

For instance, in one embodiment, the detected portion of the digital image may be layered with another image, such as for film production. In another embodiment, the detected portion/object may be projected onto a holographic projection system (e.g., be layered with an all-black background) creating a holographic display. In another embodiment, the detected portion/object may be imported into encoding software that streams video, or particularly, a holographic projection, to remote receivers. In still another embodiment, the streamed video (or holographic projection) may be accompanied by live-streamed music and/or lighting control, such as for simulcasting a concert or artist across one or more remote venues. Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

The embodiments herein may generally be performed by a collection of one or more computing devices (e.g., personal computers, laptops, servers, specifically configured computers, cloud-based computing devices, etc.), which may be interconnected via various local and/or network connections. Various actions described herein may be related specifically to one or more of the devices, though any reference to particular type of device herein is not meant to limit the scope of the embodiments herein.

Figure 1:
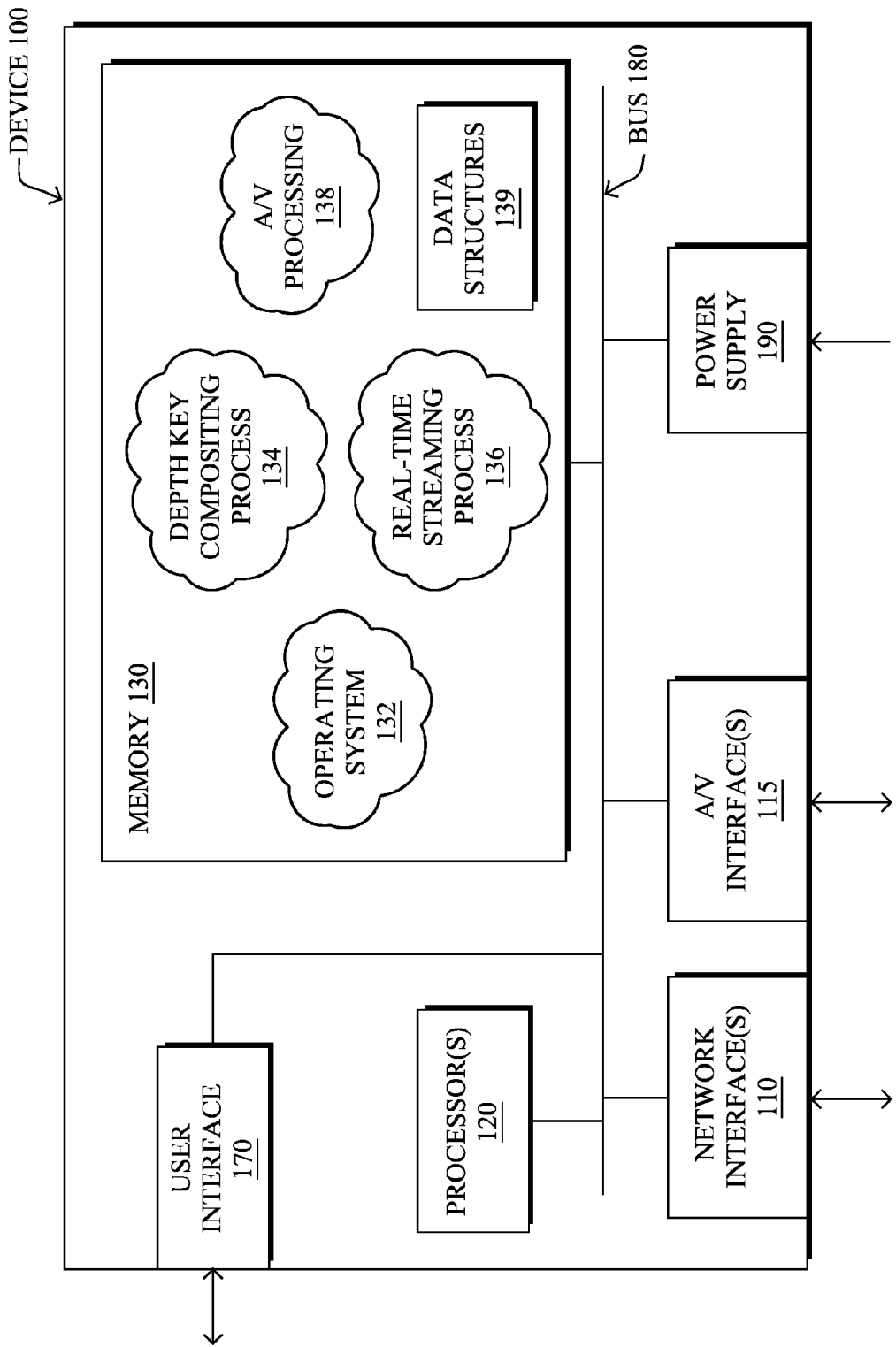
FIG. 1 illustrates an example of a computing device.

FIG. 1 is a schematic block diagram of an example computing device 100 that may be used with one or more embodiments described herein. The illustrative device may comprise at least one network interface 110, one or more audiovideo (A/V) interfaces 115, at least one processor 120, a memory 130, and user-interface components 170 (e.g., keyboard, monitor, mouse, etc.), interconnected by a system bus 180, as well as a power supply 190. Other components may be added to the embodiments herein, and the components listed herein are merely illustrative.

The network interface(s) 110 contain the mechanical, electrical, and signaling circuitry for communicating data over links coupled to a computer network. AV interfaces 115 contain the mechanical, electrical, and signaling circuitry for communicating data to/from one or more A/V devices, such as cameras, soundboards, lighting boards, display projectors, etc. The memory 130 comprises a plurality of storage locations that are addressable by the processor 120 for storing software programs and data structures associated with the embodiments described herein. The processor 120 may comprise hardware elements or hardware logic adapted to execute the software programs and manipulate the data structures 139. An operating system 132, portions of which are typically resident in memory 130 and executed by the processor, functionally organizes the machine by invoking operations in support of software processes and/or services executing on the machine. These software processes and/or services may comprise an illustrative depth key compositing process 134, a real-time streaming process 136, and A/V processing process(es) 138.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Illustratively, certain aspects of the techniques described herein may be performed by hardware, software, and/or firmware, such as in accordance with the various processes and components described herein, which may contain computer executable instructions executed by the processor 120 and/or associated hardware components to perform functions relating to the techniques described herein.

Figure 2:
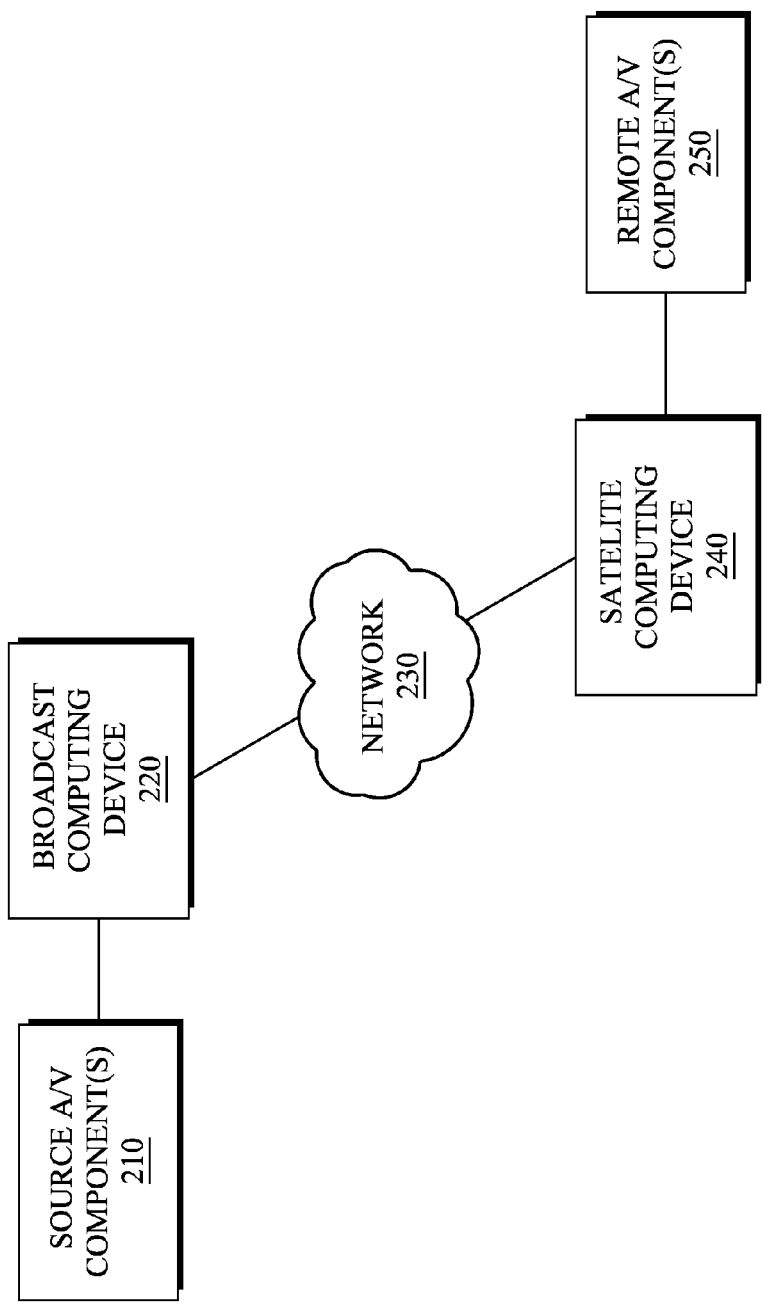
FIG. 2 illustrates an example of a communication network.

FIG. 2 illustrates an example simplified communication network, for which various components are more specifically described below. In particular, the network 200 comprises one or more source A/V components 210, one or more "broadcast" computing devices 220 (e.g., a local computing device 100), a communication network 230 (e.g., the public Internet or other communication medium, such as private networks), one or more "satellite" computing devices 240 (e.g., a remote computing device 100), and one or more remote A/V components 250.

—Depth Key Compositing—

As noted above, Chroma Keying or Chroma Key Compositing is generally a post-production technique of layering two film images together based on color. However, Chroma Key Compositing has various limitations, such as requiring a solid color background or in some instances a static background (no new objects or lighting may be introduced into the frame) and carefully planned wardrobes or object coloration to avoid unwanted imaging artifacts. Other limitations include costly and time consuming post-production work and the inability for real time adjustments for a changing environment. Other techniques, such as those based on a tracked user being specified by their skeletal recognition, also have shortcomings, such as not being able to process multiple people, non-human objects, cluttered spaces, very dark backgrounds or very bright light sources, people leaving or entering a frame, etc.

The techniques herein therefore address the problem of how a person or object can be filmed in any environment, while allowing for the separation of the person or object from its surrounding background in real time, regardless of the background in use, and while allowing them to exit and re-enter the frame. In particular, the techniques herein visually capture a person and/or object from a video scene based on depth, and isolate the captured portion of the scene from the background in real-time.

Figure 3A:
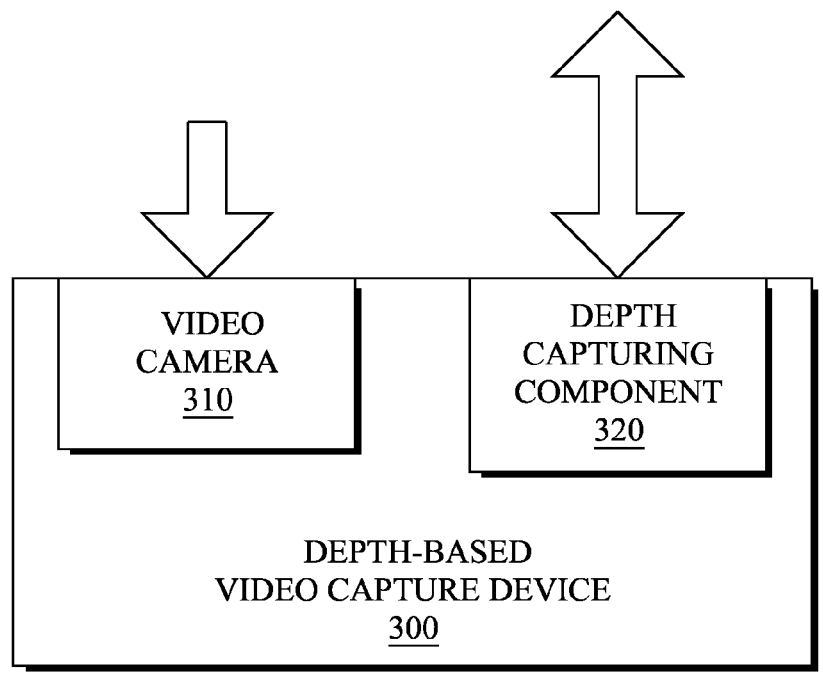
FIGS. 3A-3B illustrate examples of a depth-based video capture device.

In order to accomplish depth-based keying in this manner, a video capture device used herein may comprise a camera that is capable of detecting object distance. One such example camera that is commercially available is the KINECT camera, available from MICROSOFT. Illustratively, as shown in FIG. 3A, a depth-based video capture device 300 may comprise two primary components, namely a video camera 310 and a depth-capturing component 320. For example, the video camera 310 may comprise a "red, green, blue" (RGB) camera (also called a color video graphics array (VGA) camera), and may be any suitable rate (e.g., 30 or 60 frames per second (fps)) and any suitable resolution (e.g., 640×480 or greater, such as "high definition" resolutions, e.g., 1080p, 4K, etc.).

Figure 3B:
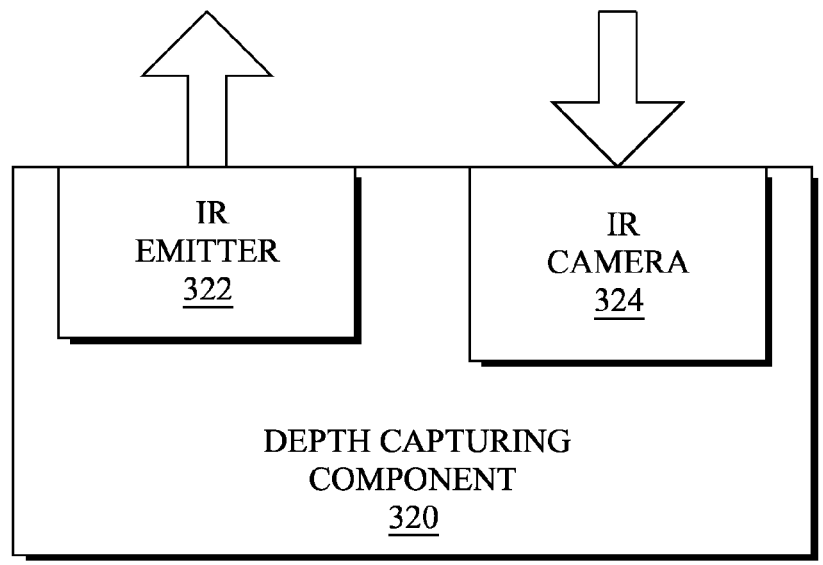

The depth capturing component 320 may comprise two separate lenses, as illustrated in FIG. 3B, such as an infrared (IR) emitter 322 to bathe the capture space in IR light, and an IR camera 324 that receives the IR light from the IR emitter as it is reflected off of the objects within the capture space. For instance, the brighter the detected IR light, the closer the object is to the camera. One specific example of an IR camera is a monochrome CMOS (complimentary metal-oxide semiconductor) sensor. Notably, the IR camera 324 (or depth capturing component 320, generally) may, though need not, have the same frame rate and resolution as the video camera 310 (e.g., 30 fps and 640×480 resolution). Note also that while the video camera 310 and depth capturing component 320 are shown as an integrated device, the two components may be separately located (including separately locating the illustrative IR emitter 322 and IR camera 324), so long as there is sufficient calibration to collaboratively determine portions of the video image based on depth between the separately located components.

Figure 4A:
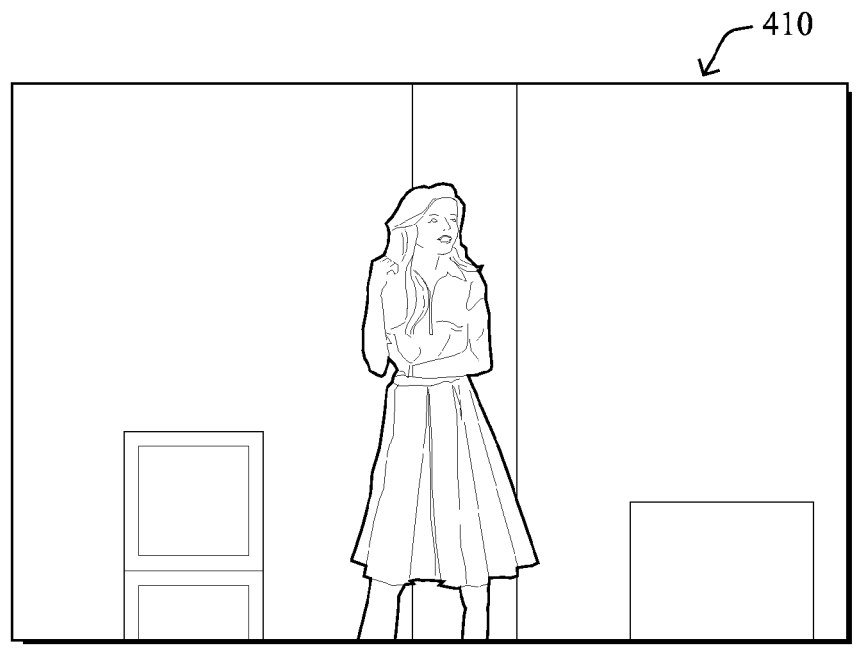
FIGS. 4A-4D illustrate an example of depth-based video capture.
Figure 4B:
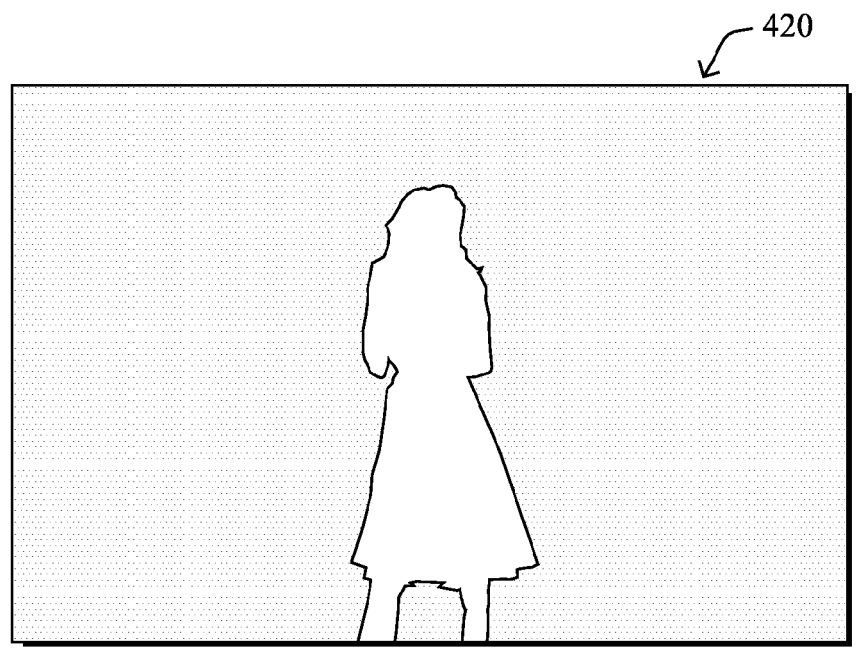

Based on inputting the images from the camera 300 (e.g., a source A/V component 210) into the broadcasting computing device 220, the corresponding depth key compositing process 134 enables setting/defining a desired depth range (e.g., manually via user interface 170, or dynamically by the process itself) using the captured depth information (e.g., IR information). For example, FIG. 4A illustrates an example source image 410 that may be captured by the video camera 310. Conversely, FIG. 4B illustrates an example depth-based image 420 that may be captured by the depth capturing component 320, such as the IR image captured by the IR camera 324 based on reflected IR light from the IR emitter 322. In particular, the image 420 in FIG. 4B may be limited (manually or dynamically) to only show the desired depth range of a given subject (person, object, etc.), such as based on the intensity of the IR reflection off the objects.

Figure 4C:
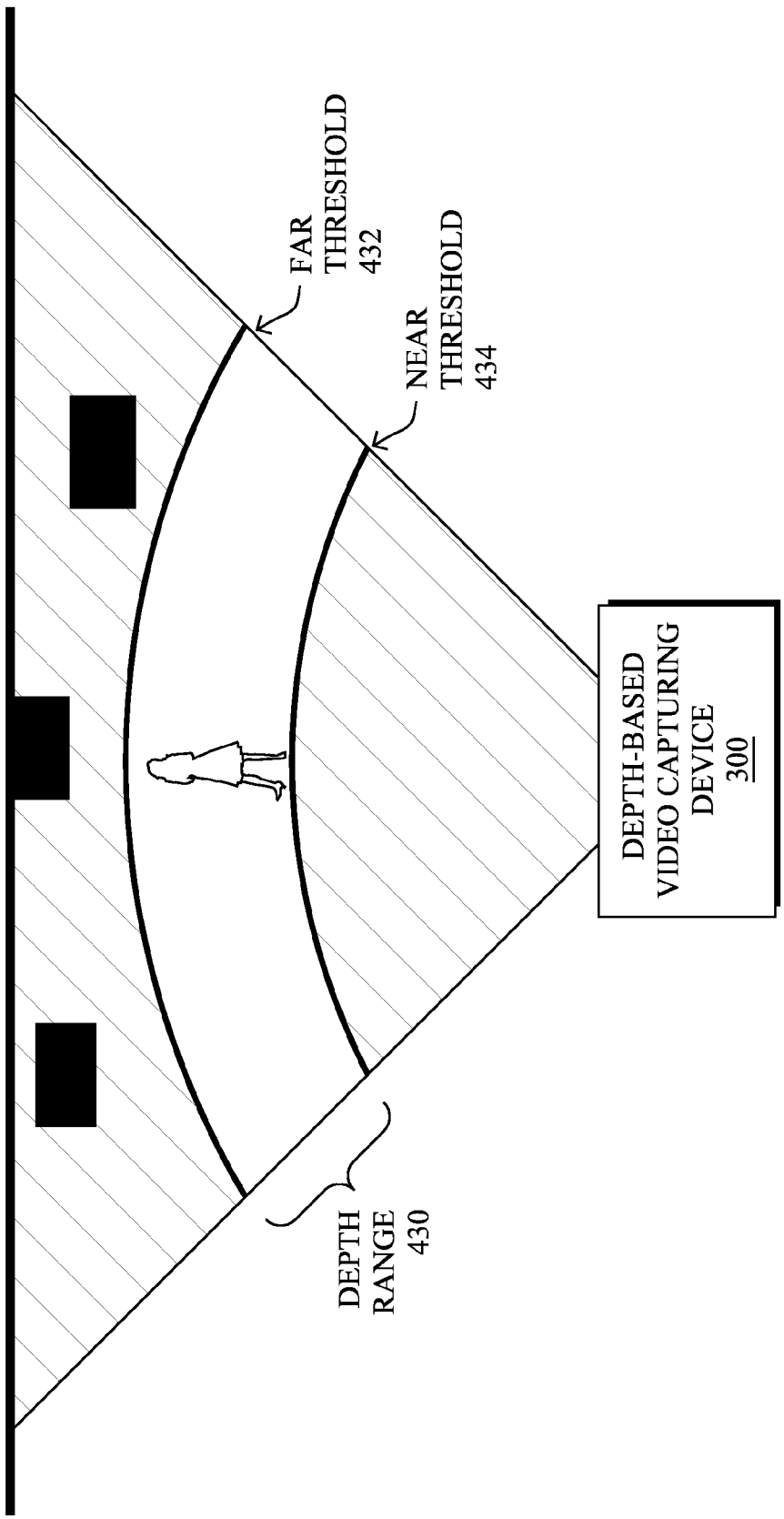

According to one or more embodiments herein, the depth range selected to produce the image 420 in FIG. 4B may be adjusted on-the-fly (e.g., manually by a technician or dynamically based on object detection technology) in order to control what can be "seen" by the camera. For instance, the techniques herein thus enable object tracking during live events, such as individual performers move around a stage. For example, as shown in FIG. 4C, an aerial view of the illustrative scene is shown, where the desired depth range 430 may be set by a "near" depth threshold 434 and a "far" depth threshold 432. As an example, a user may be prompted to press the '−' or '+' keys on a keyboard to decrease and increase the near threshold, respectively, and the '<' or '>' keys to correspondingly decrease and increase the far threshold, respectively. Other techniques (and particularly user inputs/keys) may be made available, such as defining a center depth (distance from camera) and then a depth of the distance captured surrounding that center depth, or defining a near or far depth threshold and then a further or nearer depth (in relation to the near or far depth threshold), respectively. This can also be combined with other body tracking algorithms (e.g., as described below).

Figure 4D:
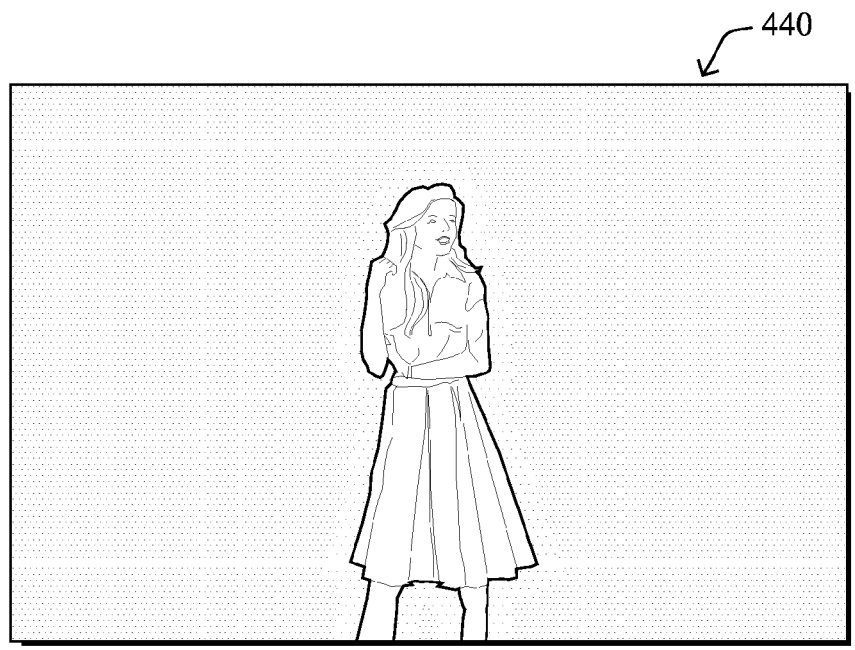

By then overlaying the depth information (IR camera information) of image 420 in FIG. 4B with the video image 410 from FIG. 4A, the techniques herein "cut out" anything that is not within a desired depth range, thus allowing the camera to "see" (display) whatever is within the set range, as illustrated by the resultant image 440 in FIG. 4D. In this manner, the background image may be removed, isolating the desired person/object from the remainder of the visual scene captured by the video camera 310. (Note that foreground images may also thus be removed, such as for various visual effects other than those specifically mentioned herein.)

By maintaining a consistent depth range 430, a mobile object or person may enter or exit the depth range, thus appearing and disappearing from view. At the same time, however, by allowing for the dynamic and real-time adjustment of the depth range as mentioned above, a mobile object or person may be "tracked" as it moves in order to maintain within the depth range, accordingly.

Notably, in one embodiment as mentioned above, body tracking algorithms, such as skeletal tracking algorithms, may be utilized to track a person's depth as the person moves around the field of view of the cameras. For example, in one embodiment, the perspective (relative size) of the skeletally tracked individual(s) (once focused on that particular individual within the desired depth range) may result in corresponding changes to the depth range: for instance, a decrease in size implies movement away from the camera, and thus a corresponding increase in focus depth, while an increase in size implies movement toward the camera, and thus a corresponding decrease in focus depth. Other skeletal techniques may also be used, such as simply increasing or decreasing the depth (e.g., scanning the focus depth toward or away from the camera) or by increasing the overall size of the depth range (e.g., moving one or both of the near and far depth thresholds in a manner that widens the depth range).

In an alternative embodiment, if body tracking is enabled, the set depth range may remain the same, but a person's body that leaves that depth range may still be tracked, and isolated from the remaining scene outside of the depth range. For instance, body tracking algorithms may be used to ensure a person remains "captured" even if they step out of the specified depth range, allowing for certain objects to be left in the depth range for capture while a person has the freedom to move out of the depth range and still be captured. As an example, assume in FIG. 4C that there was an object, such as a chair, within the specified depth range 430. If the person were to step out of the depth range 430 while body tracking in this embodiment was enabled, the chair would remain in the isolated portion of the scene, as well as the person's body, regardless of where he or she moved within the captured image space. On the contrary, in the embodiment above where the body tracking adjusts the depth range, the chair may come into "view" of the dynamically adjusted depth range 430 and become part of the isolated image only when the person moves to a depth corresponding to the chair.

Accordingly, with either type of body tracking enabled, an operator would not need to manually adjust the min/max depth to retain performers in a scene. For example, once the depth range is set, if body tracking is enabled and a person moves out of the depth range, they will still be tracked and included within the cut-out footage, whether by dynamically adjusting the depth range, or else by specifically following the person's body throughout the captured scene. (Note that the manual depth adjustments or "sliders" to set the near and far thresholds may remain available for including non-body objects in the scene.)

In accordance with one or more additional embodiments described herein, other filtering features may further adjust the area of the resultant image 440, such as by managing a Gaussian function, a "disc blur" effect, or other techniques to smooth and/or sharpen the edges of the area isolated from the video image 410. Other advanced techniques are also possible, such as skeletal tracking algorithms, which will enable a better picture and closer cutout of an individual in the desired depth range. By adding the ability to soften and blur the edges of the cut-out images, displaying (or overlaying) the depth-isolated image has edges that look smooth/realistic.

Figure 5:
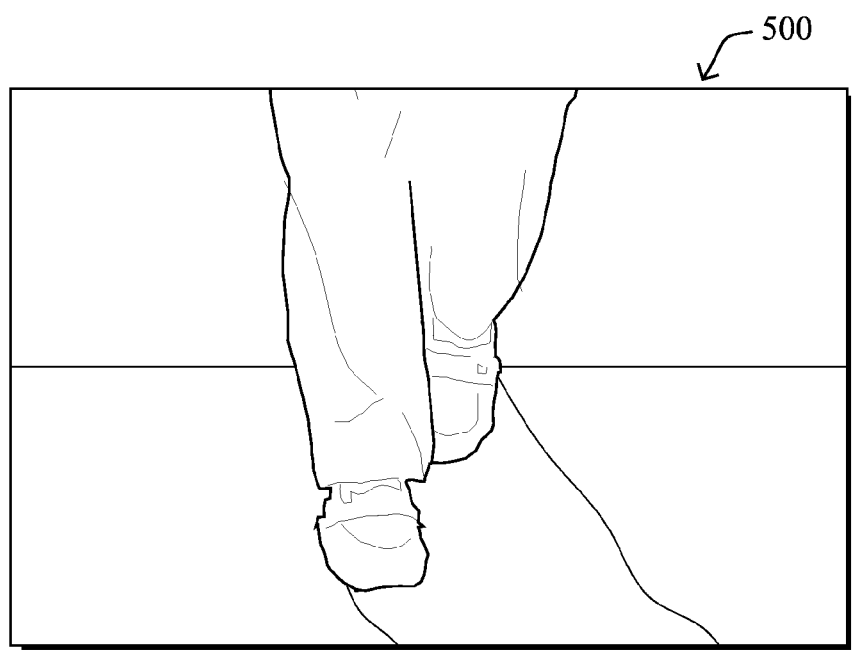
FIG. 5 illustrates an example of enhanced image processing.

Additional image processing features are also made available by the techniques herein, in order to provide greater functionality. For instance, in one embodiment, the video camera 310 and IR camera 324 (e.g., and optionally IR emitter 322 or else the entire depth capturing component 320) may be rotated vertically to achieve greater resolution when filming a standing person (e.g., such that the aspect ratio of the cameras is oriented in a vertically extended manner), for example, when objects to either side of the standing person are not required. Accordingly, in this embodiment, the final cut-out image may be rotated (e.g., 90 degrees) so the person/object is in the correct orientation when projected/overlayed in its final display application (e.g., described below). In addition, in another embodiment, the cut-out image can be flipped (e.g., horizontally and/or vertically) to display correctly (for example, when filming a guitarist, the displayed image may need to be flipped to show the guitarist playing on the correct handed guitar, depending upon the method of display, e.g., projection, reflection, digital processing, etc.). Still further, in one embodiment, the cut-out image may be resized to make the person/object a realistic size when it's displayed (e.g., bigger or smaller, wider or thinner, taller or shorter). Moreover, in yet another embodiment, post-processing techniques may be used to add scenes around the cut-out image, such as making the final result a "full-screen" image (e.g., a cut-out person standing in a generated or separately filmed background scene, etc.). For instance, in one specific example, a "floor" may be input beneath a person/object and shadows may be added on the floor (e.g., moving or stationary) to create a more realistic visual effect (particularly for holographic images), such as what is shown in FIG. 5.

—Applications—

The depth key compositing techniques above may be applied to a variety of environments, whether for film production, live streaming, simulcasts, or pre-recorded applications. For instance, the techniques herein may be used to replace current chroma key compositing techniques currently used in film production. Background removal in film is necessary to create certain special effects where a real individual or object needs to be inserted into a different or digitally created scene. Another application is holographic displays, which to date have been limited by the need to film an individual/object in a studio with a solid all-black background, or else against a solid color background and post editing (e.g., chroma keying). The depth chroma keying techniques herein, however, allow an individual/object to be filmed anywhere with any background, yet still providing the ability to obtain the required picture/video of the isolated individual/object. For film, the individual/object may thus be inserted into a scene through post-production processing or live pre-made background layers. Holograms, on the other hand, may be created without post-production editing, enabling the real-time creation of holograms, which can then be live streamed to multiple locations.

For instance, with reference again to FIG. 2, a broadcast venue may comprise the source A/V components 210, such as where a performance artist is performing (e.g., where a disc jockey (DJ) is spinning) in person. The techniques herein may then be used to stream (relay, transmit, re-broadcast, etc.) the audio and video from this broadcast location to a satellite venue, where the remote A/V components 250 are located. For instance, the DJ in the broadcast location may have the associated audio, video, and even corresponding electronic effects (lights, pyrotechnics, etc.) streamed directly to the satellite venue's A/V system with the same high quality sound as if the musician/artist was playing/singing in person.

By streaming the video image of the performer as a video and projecting it onto a holographic projection system, a true concert or nightclub experience can be transmitted across the globe for the live entertainment experience. For example, holographically live-streaming concerts to satellite venues around the globe while maintaining the live concert experience helps artists reach new markets and new revenue streams, while bringing live sets to more fans all across the world. Satellite venues can be configured to have the same concert feel as an actual show: intense lighting effects, great sound quality, bars, merchandise, etc. The only difference is that the performers are not physically present, but are holographically projected from the broadcast venue. The music is streamed directly from the soundboard of the broadcast venue and sent to state-of-the-art sound systems at the satellite venues. Light shows may accompany the performance with top of the line LED screens and lasers.

For example, once the desired image is obtained from the techniques above, the desired image may be imported into an encoding software that allows for live streaming of video, while the accompanying audio may be brought into the computer and program separately. In one embodiment, the video/audio transmission may be directly to the remote/satellite computer, or else may be uploaded to a secure webpage first, and then downloaded from the remote site(s), such as by opening this webpage on a secure computer at the satellite venues.

Figure 6:
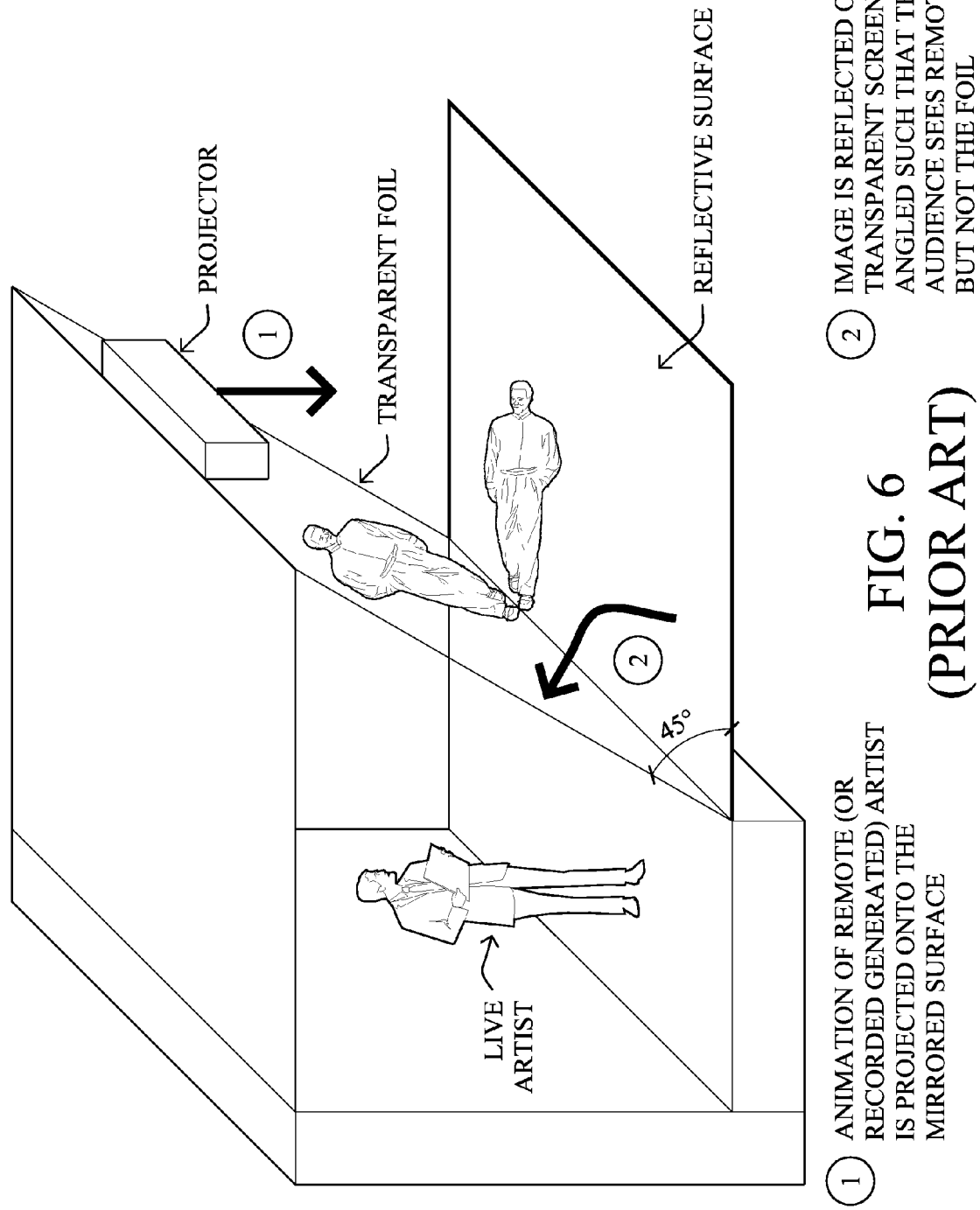
FIG. 6 illustrates an example of well-known holographic techniques.

By way of reference, FIG. 6 illustrates an example of a holographic projection system 600 that may be used along with one or more live streaming embodiments herein. For example, such a system 600 may be modeled after the well-known "Pepper's Ghost Illusion", such as that described in U.S. Pat. No. 5,865,519, issued Feb. 2, 1999 to Maass, entitled "Device for Displaying Moving Images in the Background of a Stage", or other suitable holographic projection techniques. Particularly, the streamed (or recorded, or generated) image of the artist (or other object) may be projected onto a reflective surface, such that it appears on a screen angled and the audience sees the artist or object and not the screen (e.g., at approximately 45 degrees). (Note that Pepper's Ghost Illusion was a stage trick in the late 19th Century that used live characters beneath the stage, and not a projected image of characters.) If the screen is transparent, this allows for other objects, such as other live artists, to stand in the background of the screen, and to appear to be standing next to the holographic projection when viewed from the audience. Note that any two-dimensional holographic imagery techniques may be used herein, and the illustration in FIG. 6 is merely one example embodiment. Three-dimensional holographic images may also be used, but require multiple camera angles, multiple respective depth ranges, and greater data processing.

By partnering with top tier venues across the world that have extraordinary lighting and audio systems, the live streaming of the audio-visual aspects of a broadcasting (live or pre-recorded) venue, particularly in holographic form, recreate the true concert experience across the globe. Notably, some shows may be stored and streamed at a later time, such as being streamed or played (that is, saved and sent over as a file and not streamed) with a time delay if the concert is performed in a time zone that is not convenient for the current satellite city.

In addition to concerts and nightclubs, the techniques herein may also be used for retail spaces, movie special effects, tradeshows, movie theater lobbies, conferences, speeches, retail window displays, personal appearances, and so on. Notably, the techniques herein would allow images of customers to be inserted into holographic displays. For example, a customer at a mall could stand in front of our camera and their hologram could appear in a holographic advertising display standing next to celebrity.

Figure 7:
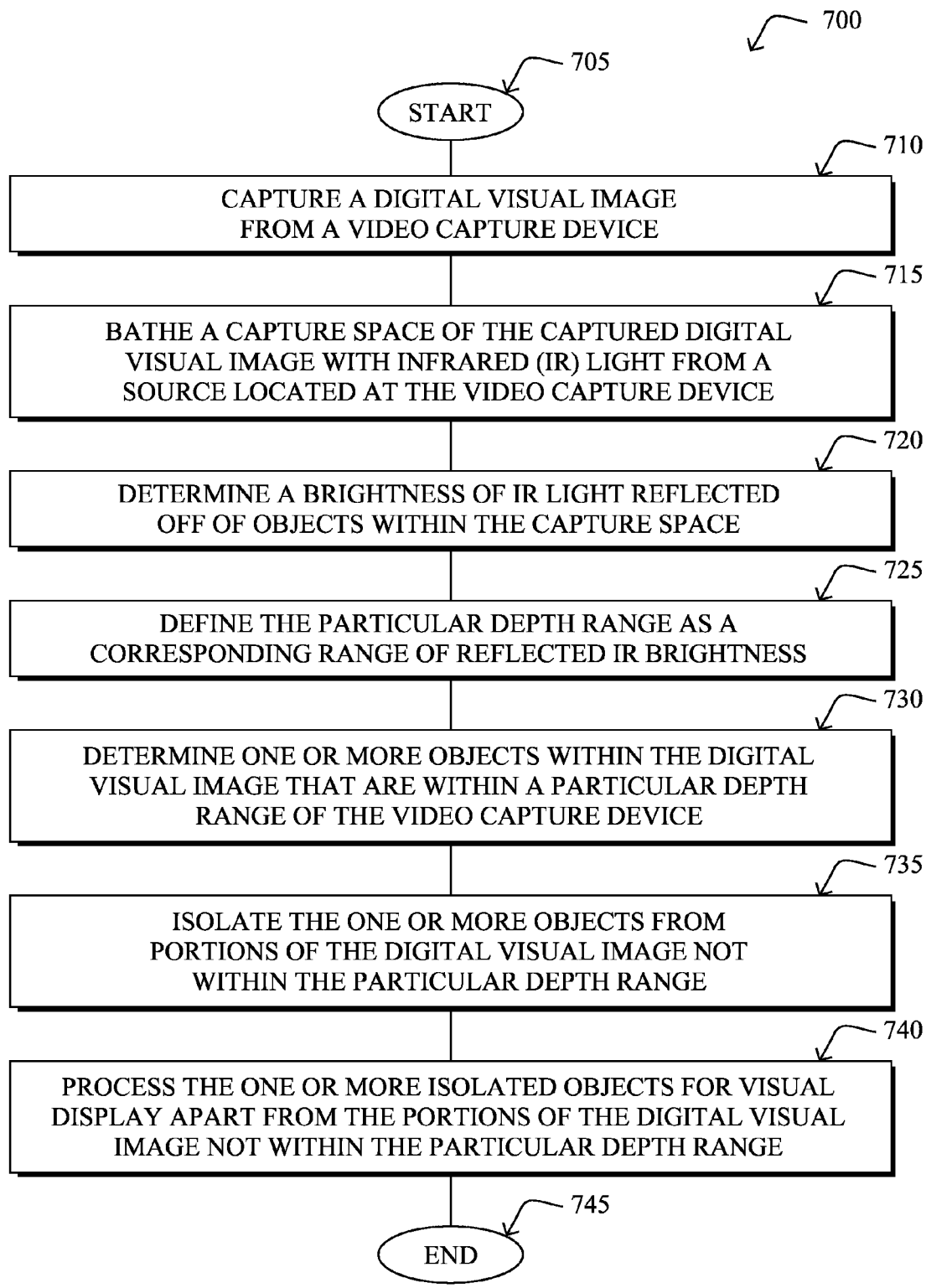
FIG. 7 illustrates an example simplified procedure for depth key compositing.

With general reference to the techniques described above, FIG. 7 illustrates an example simplified procedure for depth key compositing in accordance with one or more embodiments described herein. The procedure 700 may start at step 705, and continues to step 710, where, as described in greater detail above, a digital visual image is captured from a video capture device. Illustratively, in one embodiment, in step 715 a capture space of the captured digital visual image may be bathed with infrared (IR) light from a source located at the video capture device (e.g., integrated with the video capture device), and in step 720 a brightness of IR light reflected off of objects within the capture space in order to define the particular depth range as a corresponding range of reflected IR brightness in step 725 (e.g., manually adjusting with distance thresholds and/or dynamically adjusting with object tracking algorithms).

In step 730, one or more objects within the digital visual image are determined that are within a particular depth range of the video capture device. In one specific embodiment, determining the one or more objects within the digital visual image that are within the particular depth range of the video capture device is based on the one or more objects having a particular reflected IR brightness within the corresponding range of reflected IR brightness of the particular depth range.

In step 735, the one or more objects may be isolated from portions of the digital visual image not within the particular depth range, and the one or more isolated objects may be processed in step 740 for visual display apart from the portions of the digital visual image not within the particular depth range. For example, as noted above, such processing may comprise applying image filtering, rotating, flipping, re-sizing, adding other images around the one or more isolated objects, preparing the one or more isolated objects for holographic displays, and so on.

The simplified procedure 700 ends in step 745, notably with the option to continue to capture images, isolate objects, track objects, adjust depth ranges, etc. Also, the processing in step 740 may continue, such as storing the isolated (and processed) images, displaying the isolated images, streaming the isolated images, and so on, such as for film production and/or holographic displays.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for depth key compositing for video and holographic projections for various applications, such as film, live streaming entertainment systems, and so on. In particular, as described above, the techniques herein do not suffer from same problems as Chroma Key Compositing (green screen) technologies, and essentially all that is needed is a computer (e.g., laptop), a depth-based video camera, and lights. In addition, for performance artists, live streaming an event to satellite locations, particularly holographically, is a great way to increase exposure while gaining an additional revenue stream without added cost. Moreover, receiving a holographic live stream at a venue may be at a fraction of the cost of paying the performance artist(s) to appear in person.

The embodiments described herein, therefore, provide for depth key compositing for video and holographic projections, along with various other features. While there have been shown and described illustrative embodiments, it is to be understood that various other adaptations and modifications may be made within the spirit and scope of the embodiments herein. For example, while the embodiments have been described in terms of video capture, still pictures (stationary images) may also benefit from the techniques herein, and "video" need not limit the embodiments to motion or time-sequence photography.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  receiving, by a processor, a captured digital visual image from a video capture device;
  setting, by the processor, an adjustable particular depth range, wherein the near and far distance thresholds define the adjustable particular depth range;
  determining, by the processor, one or more objects within the digital visual image that are within the adjustable particular depth range of the video capture device;
  isolating, by the processor, the one or more objects from portions of the digital visual image not within the adjustable particular depth range;
  processing, by the processor, the one or more isolated objects for visual display apart from the portions of the digital visual image not within the adjustable particular depth range; and
  displaying the one or more isolated objects with the portions of the digital visual image not within the adjustable particular depth range removed.

2. The method as in claim 1, further comprising:
  causing, by the processor, a source located at the video capture device to bathe a capture space of the captured digital visual image with infrared (IR) light;
  determining, by the processor, a brightness of IR light reflected off of objects within the capture space; and
  defining, by the processor, the adjustable particular depth range as a corresponding range of reflected IR brightness;
  wherein determining the one or more objects within the digital visual image that are within the adjustable particular depth range of the video capture device is based on the one or more objects having a particular reflected IR brightness within the corresponding range of reflected IR brightness of the adjustable particular depth range.

3. The method as in claim 2, wherein the IR light source is integrated with the video capture device.

4. The method as in claim 1, further comprising:
  receiving instructions at the processor to adjust the adjustable particular depth range.

5. The method as in claim 4, further comprising:
  adjusting the near distance threshold and a far distance threshold by the processor based on the received instructions.

6. The method as in claim 4, further comprising:
  adjusting a center distance and distance from the center distance by the processor based on the received instructions, wherein the center distance and distance from the center distance further define the adjustable particular depth range.

7. The method as in claim 1, further comprising:
  dynamically adjusting the adjustable particular depth range by the processor.

8. The method as in claim 7, wherein dynamically adjusting is based on object detection technology.

9. The method as in claim 8, wherein object detection technology comprises skeletal tracking algorithms.

10. The method as in claim 1, wherein processing comprises:
  applying image filtering to the one or more isolated objects.

11. The method as in claim 1, wherein processing comprises:
  rotating the one or more isolated objects.

12. The method as in claim 1, wherein processing comprises:
  flipping the one or more isolated objects.

13. The method as in claim 1, wherein processing comprises:
  re-sizing the one or more isolated objects.

14. The method as in claim 1, wherein processing comprises:
  applying post-processing techniques to add other images around the one or more isolated objects.

15. The method as in claim 1, wherein processing comprises:
  preparing the one or more isolated objects for holographic displays.

16. The method as in claim 1, wherein the digital visual image is a stationary image.

17. An apparatus, comprising:
a processor configured to execute software processes; and
a memory configured to store an image processing process, the image processing process storing instructions executable by the processor to:
set an adjustable particular depth range, wherein the near and far distance thresholds define the adjustable particular depth range;
determine one or more objects within a captured digital visual image that are within the adjustable particular depth range of a video capture device that captured the digital visual image;
isolate the one or more objects from portions of the digital visual image not within the adjustable particular depth range;
process the one or more isolated objects for visual display apart from the portions of the digital visual image not within the adjustable particular depth range; and
display the one or more isolated objects with the portions of the digital visual image not within the adjustable particular depth range removed.

18. The apparatus as in claim 17, further comprising:
a video capture device configured to capture the digital visual image; and
an infrared (IR) light source at the video capture device and configured to bathe a capture space of the captured digital visual image with IR light;
wherein the image processing process further storing instructions to:
determine a brightness of IR light reflected off of objects within the capture space; and
define the adjustable particular depth range as a corresponding range of reflected IR brightness;
wherein to determine the one or more objects within the digital visual image that are within the adjustable particular depth range of the video capture device is based on the one or more objects having a particular reflected IR brightness within the corresponding range of reflected IR brightness of the adjustable particular depth range.

19. The apparatus as in claim 17, wherein the image processing process further stores instructions to adjust the adjustable particular depth range.

20. A tangible, non-transitory computer-readable media comprising instructions executable by a processor to:
set an adjustable particular depth range, wherein the near and far distance thresholds define the adjustable particular depth range;
determine one or more objects within a captured digital visual image that are within the adjustable particular depth range of a video capture device that captured the digital visual image;
isolate the one or more objects from portions of the digital visual image not within the adjustable particular depth range;
process the one or more isolated objects for visual display apart from the portions of the digital visual image not within the adjustable particular depth range; and
display the one or more isolated objects with the portions of the digital visual image not within the adjustable particular depth range removed.

* * * * *